(12) United States Patent
Gardner et al.

(10) Patent No.: US 10,247,210 B2
(45) Date of Patent: Apr. 2, 2019

(54) HYDRAULIC LOCK FOR THRUST VECTOR ACTUATOR

(71) Applicant: HONEYWELL INTERNATIONAL INC., Morris Plains, NJ (US)

(72) Inventors: Kevin Gardner, Chandler, AZ (US); Steve Abel, Chandler, AZ (US); Kellan Geck, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 225 days.

(21) Appl. No.: 15/429,728

(22) Filed: Feb. 10, 2017

(65) Prior Publication Data

US 2018/0231031 A1    Aug. 16, 2018

(51) Int. Cl.
*F15B 15/26* (2006.01)
*F02K 9/84* (2006.01)

(52) U.S. Cl.
CPC ........... *F15B 15/261* (2013.01); *F02K 9/84* (2013.01); *F05D 2260/02* (2013.01)

(58) Field of Classification Search
CPC .................................................. F15B 15/261

USPC ..................................................... 92/24, 27
See application file for complete search history.

(56) References Cited

U.S. PATENT DOCUMENTS

| 4,784,044 A | 11/1988 | Klement |
| 6,832,540 B2 | 12/2004 | Hart |
| 7,125,058 B2 | 10/2006 | Hawthorne |
| 2016/0097407 A1 | 4/2016 | Kopecek |

*Primary Examiner* — Michael Leslie
(74) *Attorney, Agent, or Firm* — Lorenz & Kopf, LLP

(57) ABSTRACT

A hydraulic lock for a thrust vector actuator includes a lock cylinder. The lock cylinder includes at least one slot and at least one bore. The slot is defined through a perimeter of the lock cylinder, and the bore is defined through a portion of the lock cylinder at a second end to extend towards a first end. The hydraulic lock includes at least one biasing member coupled to the bore. The hydraulic lock includes at least one pawl having a first pawl end and a second pawl end. The first pawl end is releasably coupled to the shaft of the thrust vector actuator. The second pawl end is coupled to the slot. The pawl is movable relative to the slot between a first, locked position in which the first pawl end is coupled to inhibit movement of the shaft, and a second, unlocked position.

20 Claims, 13 Drawing Sheets

FIG. 3

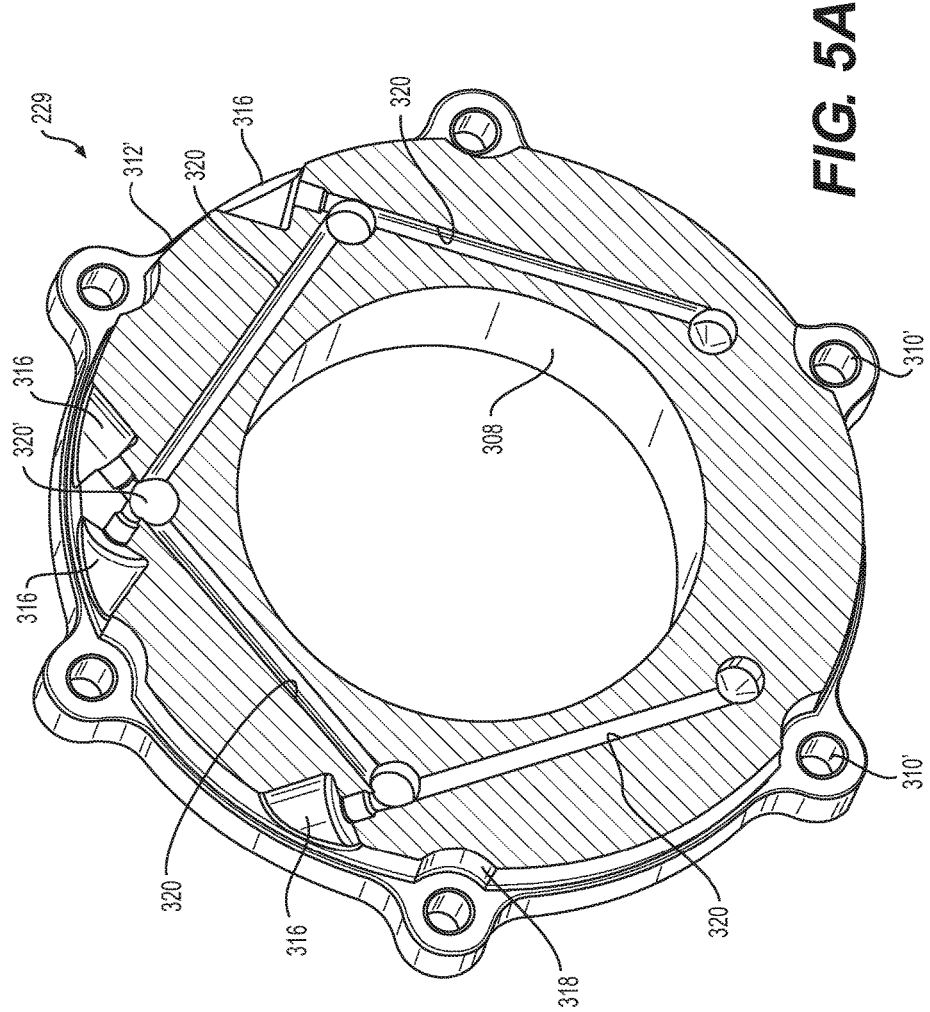

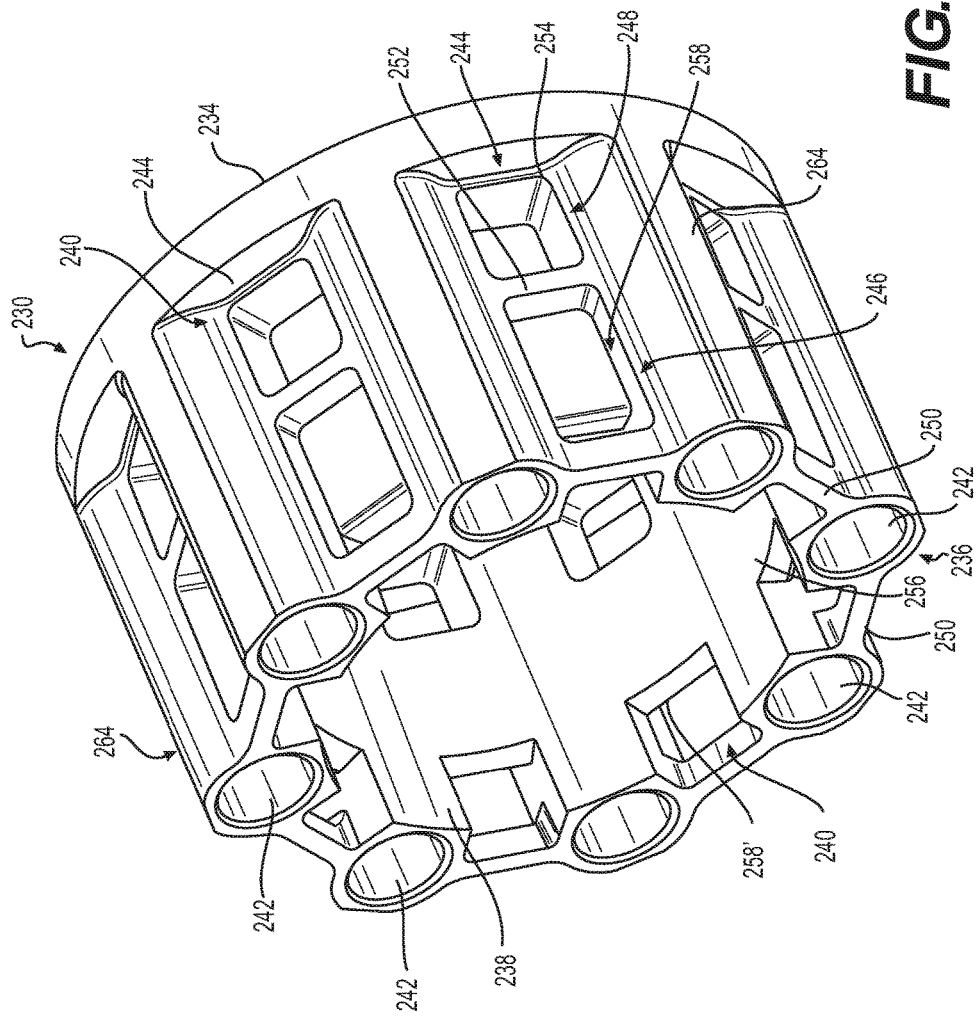

HYDRAULIC LOCK FOR THRUST VECTOR ACTUATOR

TECHNICAL FIELD

The present disclosure generally relates to thrust vector actuators, and more particularly relates to a hydraulic lock for a thrust vector actuator.

BACKGROUND

Thrust vector actuators may be employed to control a position of one or more nozzles of a rocket engine. For example, a thrust vector actuator may be coupled to a launch vehicle for launching a payload for spaceflight, and the thrust vector actuator may be actuated to control a position of the rocket engine associated with the launch vehicle during flight. During transport of the thrust vector actuator, installation of the thrust vector actuator onto the launch vehicle, and during certain engine tests and inspections, the thrust vector actuator may be required to maintain a fixed position, while being subjected to large loads.

Accordingly, it is desirable to provide a hydraulic lock for a thrust vector actuator, which maintains the thrust vector actuator in a fixed position while subjected to large loads during installation and transport. Moreover, it is desirable to provide a lock for a thrust vector actuator, which requires positive locking and unlocking of the lock. Further, it is desirable to provide a lock for a thrust vector actuator, which locks in a neutral position. Furthermore, other desirable features and characteristics of the present invention will become apparent from the subsequent detailed description and the appended claims, taken in conjunction with the accompanying drawings and the foregoing technical field and background.

SUMMARY

The various teachings of the present disclosure provides a hydraulic lock for a thrust vector actuator having a movable shaft. The hydraulic lock includes a lock cylinder having a first end and a second end. The lock cylinder includes at least one slot and at least one bore. The at least one slot is defined through a perimeter of the lock cylinder adjacent to the second end, and the at least one bore is defined through a portion of the lock cylinder at the second end to extend towards the first end. The hydraulic lock includes at least one biasing member coupled to the at least one bore. The hydraulic lock also includes at least one pawl having a first pawl end and a second pawl end. The first pawl end is releasably coupled to a groove defined in the shaft of the thrust vector actuator. The second pawl end is coupled to the at least one slot. The at least one pawl is movable relative to the at least one slot between a first, locked position in which the first pawl end is coupled to the groove to inhibit movement of the shaft, and a second, unlocked position in which the first pawl end is released from the groove. The hydraulic lock also includes a cover coupled to the at least one biasing member. A movement of the lock cylinder towards the cover moves the at least one pawl from the first, locked position to the second, unlocked position.

Further provided is a hydraulic lock for a thrust vector actuator having a movable shaft. The hydraulic lock includes a lock cylinder having a first end and a second end. The lock cylinder includes at least one slot and at least one bore. The at least one slot is defined through a sidewall of the lock cylinder adjacent to the second end, and the at least one bore is defined through a portion of the lock cylinder at the second end to extend towards the first end. The sidewall has a first surface opposite a second surface, and a ledge that extends from the second surface towards the first surface. The hydraulic lock includes at least one biasing member coupled to the at least one bore. The hydraulic lock also includes at least one pawl having a first pawl end and a second pawl end. The first pawl end is releasably coupled to a groove defined in the shaft of the thrust vector actuator, and the second pawl end is coupled to the at least one slot. The at least one pawl is movable relative to the at least one slot between a first, locked position in which the first pawl end is coupled to the groove to inhibit movement of the shaft, and a second, unlocked position in which the first pawl end is released from the groove. The second pawl end has a first ramp surface that engages with the ledge as the at least one pawl moves from the first, locked position to the second, unlocked position. The hydraulic lock includes a cover coupled to the at least one biasing member and the at least one pawl. A movement of the lock cylinder towards the cover moves the at least one pawl from the first, locked position to the second, unlocked position.

Also provided is a thrust vector actuator having a movable shaft. The thrust vector actuator includes a lock housing that surrounds the shaft and defines at least one conduit in fluid communication with a hydraulic source to receive a hydraulic fluid. The lock housing includes at least one lock piston received within the at least one conduit. The thrust vector actuator includes a lock. The lock includes a lock cylinder having a first end and a second end. The lock cylinder includes at least one slot and at least one bore. The at least one slot is defined through a sidewall of the lock cylinder adjacent to the second end, and the at least one bore is defined through a portion of the lock cylinder at the second end to extend towards the first end. The sidewall has a first surface opposite a second surface, and a ledge that extends from the second surface towards the first surface. The lock includes at least one biasing member coupled to the at least one bore and at least one pawl having a first pawl end and a second pawl end. The first pawl end is releasably coupled to a groove defined in the shaft of the thrust vector actuator. The second pawl end is coupled to the at least one slot. The at least one pawl is movable relative to the at least one slot between a first, locked position in which the first pawl end is coupled to the groove to inhibit movement of the shaft, and a second, unlocked position in which the first pawl end is released from the groove. The second pawl end having a first ramp surface that engages with the ledge as the at least one pawl moves from the first, locked position to the second, unlocked position. The lock includes a cover coupled to the at least one biasing member. Upon receipt of the hydraulic fluid, the at least one lock piston contacts the first end of the lock cylinder to move the lock cylinder towards the cover, and the movement of the cover moves the at least one pawl from the first, locked position to the second, unlocked position.

DESCRIPTION OF THE DRAWINGS

The exemplary embodiments will hereinafter be described in conjunction with the following drawing figures, wherein like numerals denote like elements, and wherein:

FIG. 5A is a cross-sectional view of the lock housing of FIG. 5, taken along line 5A-5A of FIG. 5, which illustrates hydraulic passages that supply hydraulic fluid to the at least one lock piston of the lock;

FIG. 6 is a perspective view of the lock cylinder of the lock of FIG. 1;

DETAILED DESCRIPTION

Figure 1:
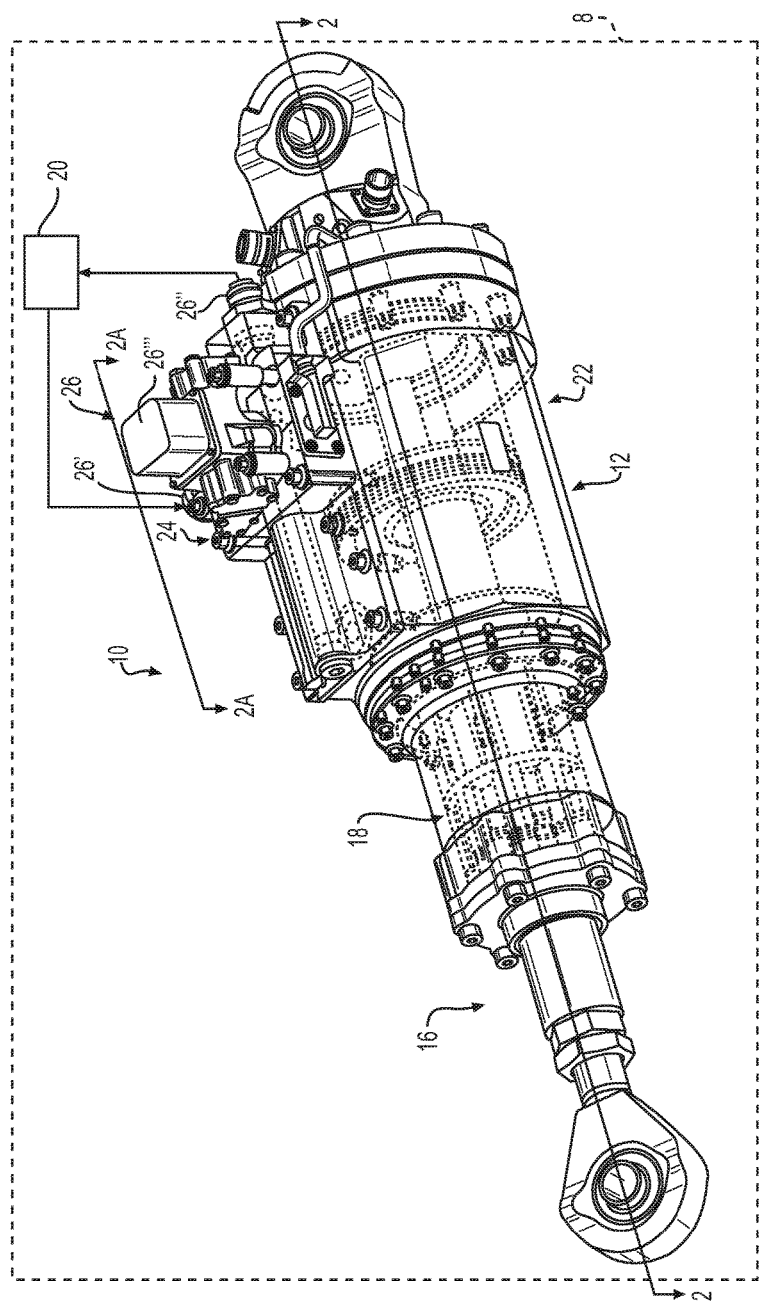
FIG. 1 is a schematic illustration of a thrust vector actuator including a hydraulic lock according to the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any mobile platform or vehicle, such as an aircraft, rocket marine vessel, and the like that would benefit from thrust vector control with a thrust vector actuator having a hydraulic lock, and that the thrust vector actuator described herein for use with a launch vehicle is merely one exemplary embodiment according to the present disclosure. Moreover, while the hydraulic lock is described herein as being used with a thrust vector actuator for a launch vehicle, the various teachings of the present disclosure can be used with projectile, such as a ballistic or tactical missile. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a thrust vector actuator 10 is shown. The thrust vector actuator 10 may be coupled to a launch vehicle 8 to control a position of a rocket engine associated with the launch vehicle 8 during a flight of the launch vehicle 8. In one example, the thrust vector actuator 10 is hydraulically actuated, and includes a housing assembly 12, a piston assembly 16 and a lock 18. As will be discussed, the lock 18 is actuated by a hydraulic source 20 to move the lock from a first, locked position to a second, unlocked position to enable the movement of the piston assembly 16 relative to the housing assembly 12. Generally, the lock 18 moves to the second, unlocked position upon the application of a hydraulic pressure by the hydraulic source 20 above a predefined threshold, and moves to the first, locked position when the hydraulic pressure drops below the predefined threshold. Thus, in this example, the hydraulic source 20 is employed to actively unlock the lock 18. The lock 18 also provides for locking the thrust vector actuator 10 in a neutral position. In this regard, the lock 18 enables the thrust vector actuator 10 to be locked such that a piston 102 of the piston assembly 16 is in a neutral position.

Figure 2:
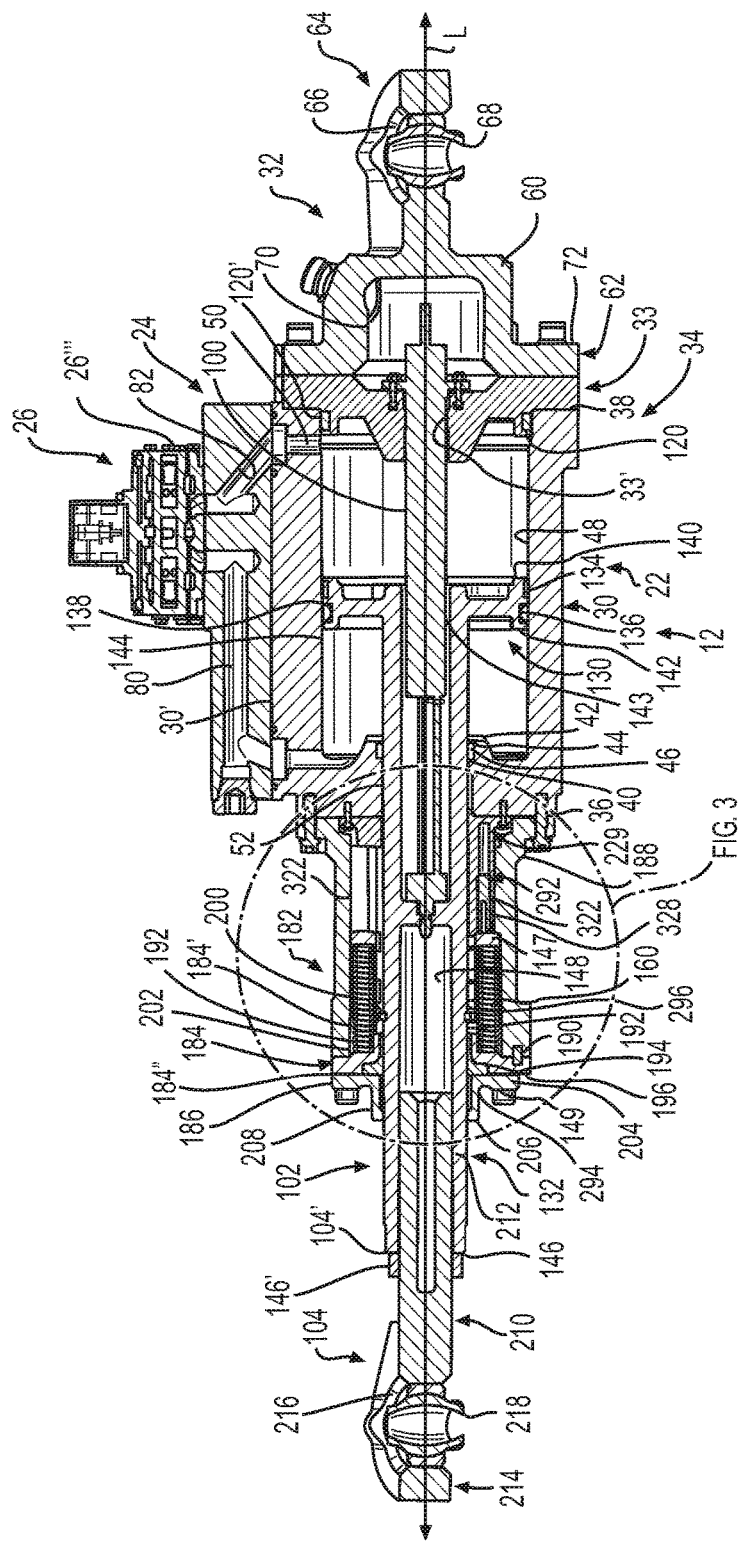
FIG. 2 is a cross-sectional view of the thrust vector actuator of FIG. 1, taken along line 2-2 of FIG. 1, which illustrates the lock in a first, locked position.

The housing assembly 12 includes a main housing 22, a manifold 24 and a hydraulic supply and return device 26. As will be discussed further herein, the hydraulic supply and return device 26 is fluidly coupled to the hydraulic source 20. The hydraulic source 20 is fluidly coupled to the lock 18 and a servo motor valve actuator or servo valve 26''' associated with the hydraulic supply and return device 26 to supply hydraulic fluid to the lock 18 and to the servo valve 26'''. The servo valve 26''' controls the thrust vector actuator 10 with the hydraulic fluid received from the hydraulic source 20. With reference to FIG. 2, the main housing 22 includes a first housing portion 30, a second housing portion 32 and a third housing portion 33, which cooperate to couple a portion of the piston assembly 16 to the main housing 22. The main housing 22 is generally formed of a metal or metal alloy, and may be cast, machined, forged, etc.

The first housing portion 30 is substantially cylindrical, and with reference to FIG. 2, the first housing portion 30 extends from a first end 34 to a second end 36. The first end 34 is coupled to a portion of the piston assembly 16 and to the third housing portion 33. In one example, the first end 34 includes a mounting flange 38, which includes one or more threaded bores for receipt of a respective one or more mechanical fasteners, such as bolts, to couple the second housing portion 32 and the third housing portion 33 to the first housing portion 30. The second end 36 defines a central bore 40, and may include a sealing flange 42 defined about the central bore 40. The central bore 40 enables a portion of the piston assembly 16 to move relative to the main housing 22. The sealing flange 42 is defined about a perimeter of the central bore 40 along a first surface of the second end 36, and includes a recess 44. The recess 44 receives a sealing member 46, which prevents or inhibits the leakage of hydraulic fluid from the main housing 22 during the movement of the portion of the piston assembly 16. A second surface of the second end 36, which is substantially opposite the first surface and the sealing flange 42, is coupled to a portion of the piston assembly 16. As will be discussed, the portion of the lock 18 is coupled to the second end 36 of the first housing portion 30 so as to enable fluid communication between the manifold 24 and the lock 18.

Figure 2A:
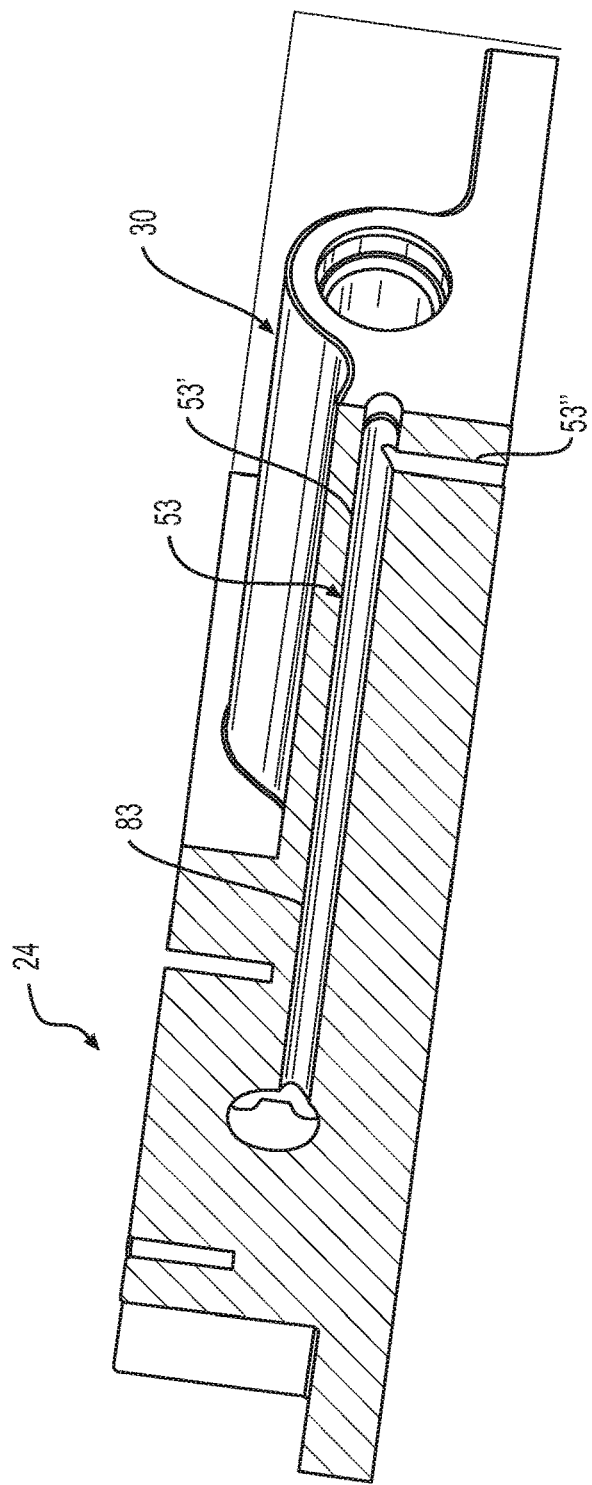
FIG. 2A is a cross-sectional view of the thrust vector actuator of FIG. 1, taken along line 2A-2A of FIG. 1, which illustrates a lock inlet bore that supplies hydraulic fluid from a hydraulic source to the lock.

The first housing portion 30 also cooperates with the third housing portion 33 to define a hydraulic chamber 48. The hydraulic chamber 48 is defined between the first end 34 and the second end 36 and receives hydraulic fluid from the hydraulic source 20. In this example, the first housing portion 30 also defines a first inlet bore 50, a second inlet bore 52 and a lock inlet bore 53 (FIG. 2A). Each of the first inlet bore 50, the second inlet bore 52 and the lock inlet bore 53 are in fluid communication with the manifold 24 to receive hydraulic fluid. In this example, the first inlet bore 50 is defined near, adjacent to or at the first end 34, and supplies the hydraulic chamber 48 with hydraulic fluid from the manifold 24. Thus, the first inlet bore 50 is in fluid communication with the manifold 24 and the hydraulic chamber 48 to supply the hydraulic chamber 48 with hydraulic fluid from the manifold 24 on a first face 140 of a piston 102 of the piston assembly 16. The second inlet bore 52 is defined near, adjacent to or at the second end 36, and supplies the hydraulic chamber 48 with hydraulic fluid from the manifold 24 on a second face 142 of a piston 102 of the piston assembly 16. The lock inlet bore 53 is in fluid communication with the manifold 24 and the lock 18 to supply the lock 18 with hydraulic fluid from the manifold 24. With reference to FIG. 2A, the lock inlet bore 53 directs the hydraulic fluid from the first housing portion 30 to the lock 18, and generally includes a first passage 53', a second passage 53" and a third passage 53''' (FIG. 4) defined within the first housing portion 30. The first passage 53' is substantially perpendicular to a second passage 53" to direct the hydraulic fluid from the manifold 24 towards the lock 18. With brief reference to FIG. 4, the third passage 53''' fluidly couples the second passage 53" to the lock 18. With reference back to FIG. 2A, a plug may be inserted into an end of the first passage 53' to inhibit the hydraulic fluid from flowing out of the lock inlet bore 53.

With reference to FIG. 2, the second housing portion 32 is coupled to the piston assembly 16. The second housing portion 32 is substantially hat-shaped, and includes a first portion end 60, a second portion end 62 and a mounting extension 64. The first portion end 60 is circumferentially closed, and encloses a portion of the piston assembly 16. The mounting extension 64 is coupled to the first portion end 60, and extends outwardly from the first portion end 60 along a longitudinal axis L of the thrust vector actuator 10. The mounting extension 64 defines a bore 66, which receives and is coupled to a spherical bearing 68. The spherical bearing 68 is coupled to a portion of the launch vehicle 8, such as a thrust frame, for example.

The first portion end 60 and the second portion end 62 cooperate to define a second chamber 70, which receives the portion of the piston assembly 16. The second portion end 62 includes a second mounting flange 72, which is defined about the perimeter of the second portion end 62. Generally, the second mounting flange 72 defines one or more throughbores, which each receive a respective one of the one or more mechanical fasteners therethrough for coupling the second housing portion 32 to the third housing portion 33.

The third housing portion 33 is positioned between the first housing portion 30 and the second housing portion 32. The third housing portion 33 is substantially circular, and is sized to seal against the first housing portion 30 to form the hydraulic chamber 48. The third housing portion 33 is generally coupled between the first housing portion 30 and the second housing portion 32 via the mechanical fasteners received through the throughbores of the second mounting flange 72, which pass through corresponding throughbores defined about a perimeter of the third housing portion 33 and matingly engage with the plurality of bores defined in the mounting flange 38. The third housing portion 33 defines a bore 33', which receives a portion of the piston assembly 16. The third housing portion 33 may also define a groove 120, which receives a sealing member 120' to inhibit or prevent a leakage of hydraulic fluid from the hydraulic chamber 48.

The manifold 24 is coupled to the first housing portion 30, and in this example, is coupled to a sidewall 30' of the first housing portion 30. The manifold 24 is composed of a metal or metal alloy, and is cast, forged, machined, selective laser sintered, etc. With reference to FIG. 1, in one example, the manifold 24 is coupled to the sidewall 30' via one or more mechanical fasteners, which threadably engage threaded bores defined in the sidewall 30'. It should be noted, however, that the manifold 24 may be coupled to the housing assembly 12 via any suitable technique, such as welding, brazing, etc. or may be integrally formed with the housing assembly 12. With reference back to FIG. 2, the manifold 24 is in fluid communication with the first inlet bore 50, the second inlet bore 52, the lock inlet bore 53 and the hydraulic source 20 to distribute the hydraulic fluid from the hydraulic source 20 into the first inlet bore 50, the second inlet bore 52 and the lock inlet bore 53. Generally, the manifold 24 defines a first fluid passage 80 in fluid communication with the second inlet bore 52, a second fluid passage 82 in fluid communication with the first inlet bore 50 and a third fluid passage 83 in fluid communication with the lock inlet bore 53 (FIG. 2A). In one example, the hydraulic supply and return device 26 controls the flow of the hydraulic fluid into the first inlet bore 50 and the second inlet bore 52 of the manifold 24, and enables the flow of hydraulic fluid into the lock inlet bore 53.

In this example, with reference to FIG. 1, the hydraulic supply and return device 26 includes a hydraulic inlet 26', a hydraulic outlet 26" (FIG. 2) and the servo valve 26'. The hydraulic inlet 26' is fluidly coupled to the manifold 24 and is fluidly coupled to the hydraulic source 20. The hydraulic inlet 26' receives the hydraulic fluid from the hydraulic source 20, and directs the hydraulic fluid into the lock inlet bore 53 and to the servo valve 26'. The hydraulic outlet 26" is in fluid communication with the hydraulic source 20, and serves to return hydraulic fluid from the manifold 24. The servo valve 26' controls the flow of hydraulic fluid into the first inlet bore 50 and the second inlet bore 52 from the manifold 24 to control the thrust vector actuator 10. In this example, the servo valve 26' is a four-way, two-stage, electro-hydraulic servo-valve (EHSV), which is closed-center. Generally, with one polarity (of received electrical input) the servo valve 26''' routes hydraulic fluid into the first inlet bore 50 and routes hydraulic fluid from the second inlet bore 52 into the hydraulic outlet 26''; while for the opposite polarity the servo valve 26''' routes the hydraulic fluid to the second inlet bore 52 and routes hydraulic fluid from the first inlet bore 50 into the hydraulic outlet 26''.

With reference to FIG. 2, the piston assembly 16 is at least partially received within the housing assembly 12. In one example, the piston assembly 16 includes a sensor 100, the piston 102 and a rod end 104. In this example, the sensor 100 is a linear variable differential transformer (LVDT), which observes a position of the piston 102 and generates sensor signals based thereon. The sensor 100 is coupled to the third housing portion 33 and to the piston 102.

The piston 102 is movable within the first housing portion 30. The piston 102 includes a head 130 and a piston shaft 132. The head 130 and the piston shaft 132 may be composed of a metal or metal alloy, and may be cast, forged, machined, selective laser sintered, etc. The head 130 is received within the first housing portion 30, and is slidable linearly within the first housing portion 30 from the first end 34 to the second end 36. The head 130 is circular, and includes at least a first guide ring 134 and a piston seal 136, which are each received in respective recesses 138 defined about the perimeter or circumference of the head 130. The head 130 has a first face 140 substantially opposite a second face 142, and defines a head bore 143 through the first face 140 and the second face 142. The hydraulic fluid from the first inlet bore 50 acts against the first face 140 to move the piston 102 within the hydraulic chamber 48. The second face 142 is coupled to the piston shaft 132. The hydraulic fluid from the second inlet bore 52 acts against the second face 142 to move the piston 102 within the hydraulic chamber 48. The head bore 143 is defined about a central axis of the head 130, and enables a portion of the sensor 100 to pass through the head 130.

The piston shaft 132 is substantially cylindrical, and includes a first piston shaft end 144 and a second piston shaft end 146. A central shaft bore 148 is defined from the first piston shaft end 144 to the second piston shaft end 146, and is in communication with the head bore 143. The first piston shaft end 144 is coupled to the second face 142, and the second piston shaft end 146 is coupled to the rod end 104. Generally, a portion of the sensor 100 extends through the head bore 143 and into the central shaft bore 148 at the first piston shaft end 144. The sensor 100 extends into the central shaft bore 148 and is coupled to a sensor mounting flange 147 defined within the central shaft bore 148 between the first piston shaft end 144 and the second piston shaft end 146. The second piston shaft end 146 is circumferentially open, and is coupled to the rod end 104. Generally, a portion of the rod end 104 is received within the central shaft bore 148 to assist in coupling the rod end 104 to the second piston shaft end 146. The second piston shaft end 146 may also include a nut 146', which may threadably engage one or more threads defined on an exterior surface 104' of the rod end 104 to couple the rod end 104 to the piston shaft 132.

The piston shaft 132 also includes an annular recess or groove 149 defined about a perimeter or circumference of the piston shaft 132. The annular groove 149 may be defined by milling, machining, etc. The annular groove 149 receives a portion of the lock 18 to enable the lock 18 to fix the position of the piston shaft 132. The annular groove 149 has a substantially U-shaped cross-section; however the annular groove 149 may have any cross-section. In this example, the annular groove 149 is defined so as to be continuous about the perimeter or circumference of the piston shaft 132 to enable the piston shaft 132 to rotate relative to the lock 18. It will be understood, however, that the annular groove 149 need not be continuous about the circumference of the piston shaft 132. Rather, the annular groove 149 may be interrupted or discontinuous such that a portion of the annular groove 149 is defined for each respective portion of the lock 18 to engage in instances where the piston shaft 132 is inhibited from rotating relative to the lock 18. In addition, the annular groove 149 may include one or more alignment features, if desired, to assist in coupling the lock 18 to the piston shaft 132.

The rod end 104 is coupled to the piston shaft 132 at the second piston shaft end 146, and may be at least partially received within the central shaft bore 148 of the piston shaft 132 to aid in coupling the rod end 104 to the piston shaft 132. The rod end 104 includes a body 210 that defines a first rod end 212 and a second, opposite rod end 214. The body 210 may define a plurality of threads between the first rod end 212 and the second rod end 214, which matingly engage with the nut 146' to couple the rod end 104 to the piston shaft 132.

The first rod end 212 is received within the central shaft bore 148 of the piston shaft 132. The second rod end 214 includes a bore 216, which receives a second spherical bearing 218. The second spherical bearing 218 is coupled to the bore 216 and the second spherical bearing 218 is coupled to a thrust nozzle, for example, such that movement of the piston 102 relative to the housing assembly 12 results in a corresponding movement of the thrust nozzle.

The piston assembly 16 may also include an end cap 186. The end cap 186 is substantially hat-shaped, and defines a first cap end 204, a second cap end 206 and a central cap bore 208, which extends from the first cap end 204 to the second cap end 206. The first cap end 204 is coupled to the cover mounting flange 196 of an enclosure cover 184, and includes a plurality of bores, which receive a respective one of a plurality of mechanical fasteners to couple the end cap 186 to an enclosure housing 182 of the lock 18. The second cap end 206 is substantially opposite the first cap end 204. The central cap bore 208 receives a portion of the piston shaft 132, and may receive and retain a bushing to aid in the movement of the piston shaft 132 relative to the end cap 186.

Figure 3:
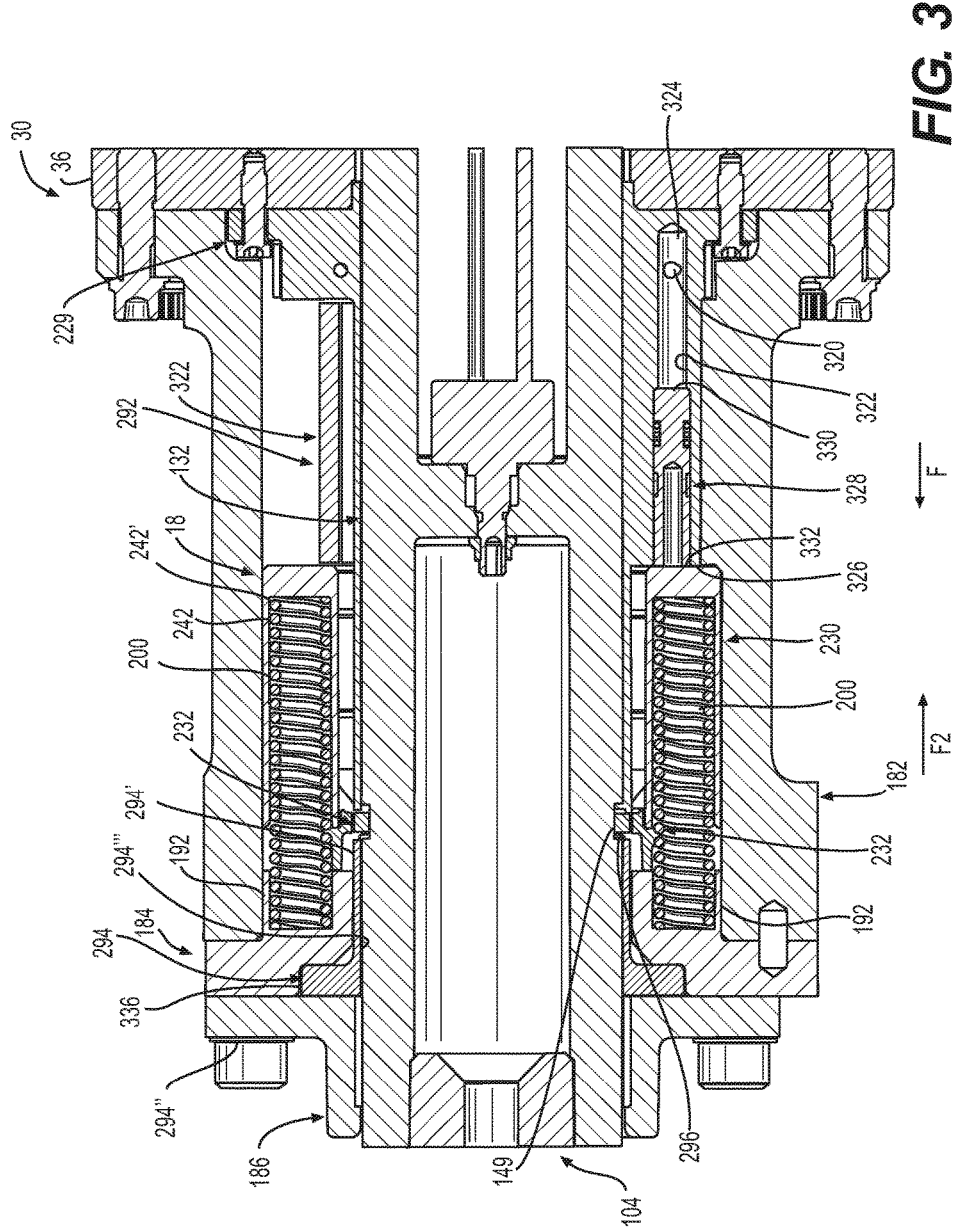
FIG. 3 is a detail cross-sectional view of the lock of the thrust vector actuator of FIG. 1, taken at 3 in FIG. 2.
Figure 4:
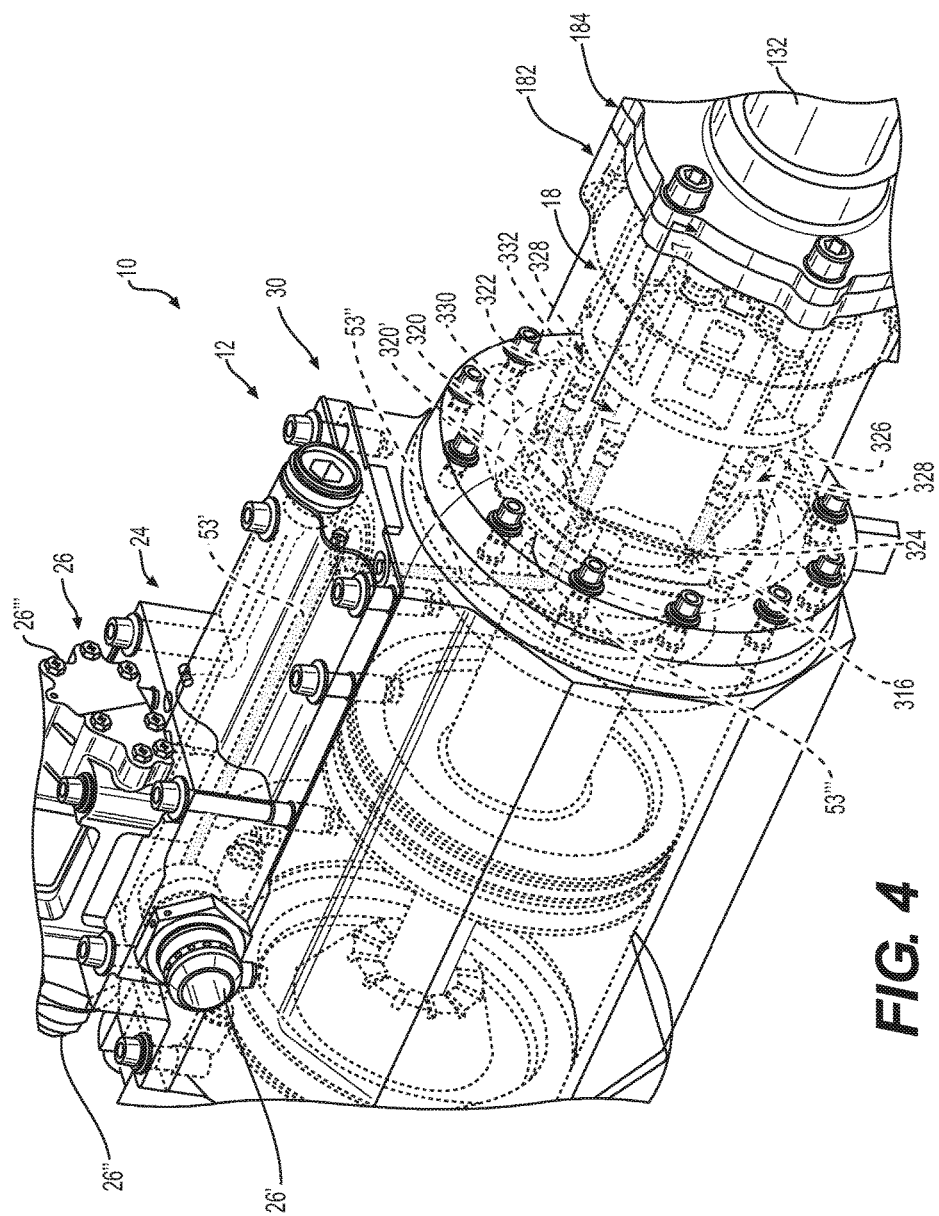
FIG. 4 is a perspective view of a portion of the thrust vector actuator of FIG. 1, which illustrates at least one lock piston of a lock housing engaged with a lock cylinder of the lock.

With reference to FIG. 3, the lock 18 is shown in greater detail. In FIG. 3, the lock 18 is in the first, locked position such that the movement of the piston shaft 132 relative to the housing assembly 12 is inhibited or prevented. In one example, the lock 18 includes the enclosure housing 182, the enclosure cover 184, a lock housing 229, a lock cylinder 230, the springs 200, and at least one or a plurality of pawls 232. In this example, as shown in FIG. 4, there are 8 pawls 232 and 8 springs 200 employed with the lock 18. It should be understood, however, that the lock 18 may include any number of pawls and springs, and that the use of 8 is merely exemplary.

In this example, with reference to FIG. 2, the enclosure housing 182 is substantially cylindrical, and is coupled about the lock housing 229. The enclosure housing 182 encloses the lock housing 229 and may protect the lock housing 229 from the environment surrounding the thrust vector actuator 10. The enclosure housing 182 includes a first enclosure end 188 substantially opposite a second enclosure end 190. The first enclosure end 188 includes a plurality of bores defined about a perimeter or circumference of the enclosure housing 182, which receive a plurality of mechanical fasteners to couple the enclosure housing 182 to the second end 36 of the first housing portion 30. The second enclosure end 190 is coupled to the enclosure cover 184, and defines a plurality of threaded bores to receive a respective one of a plurality of mechanical fasteners to couple the enclosure cover 184 to the enclosure housing 182.

Figure 2B:
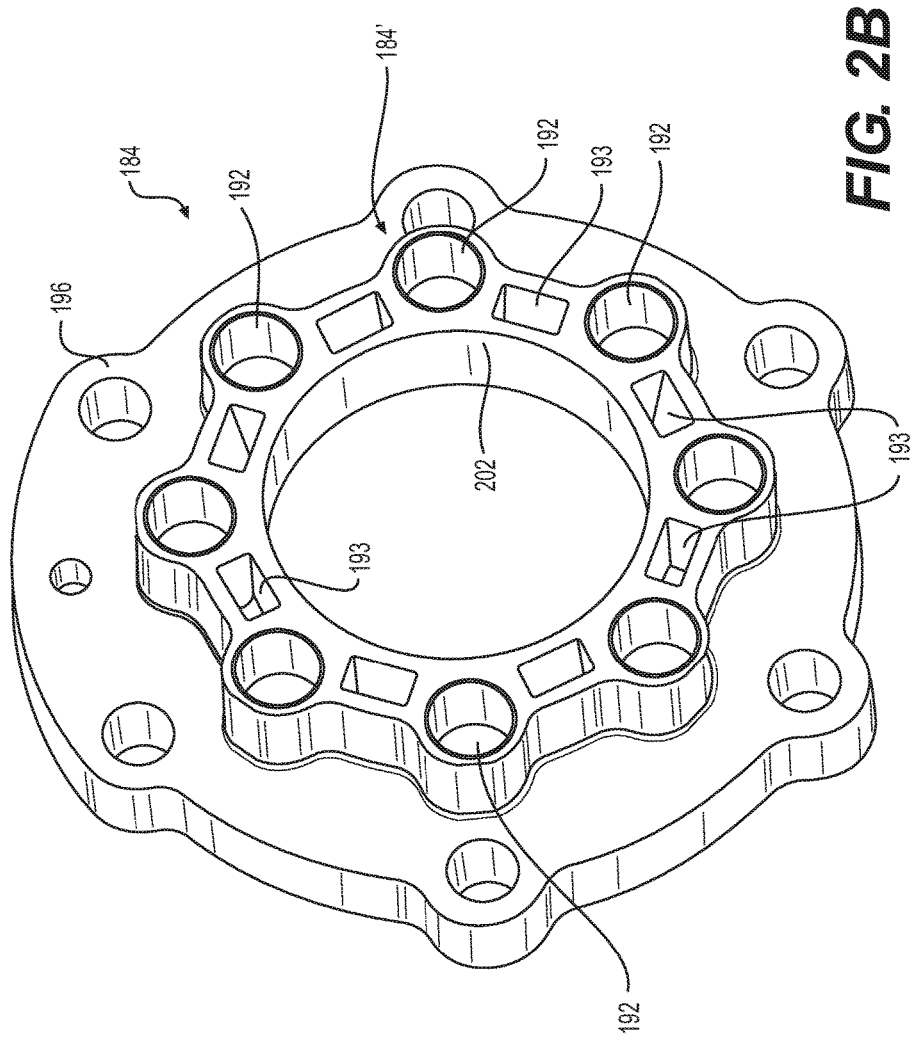
FIG. 2B is a perspective view of an enclosure cover of the lock of the thrust vector actuator of FIG. 1.

The enclosure cover 184 is positioned between the enclosure housing 182 and the end cap 186. The enclosure cover 184 is annular, and includes a plurality of spring seats 192, a plurality of pawl recesses 193, a lip recess 194 and a cover mounting flange 196. The enclosure cover 184 is composed of a metal or a metal alloy, such as aluminum, and may be stamped, cast, forged, etc. With reference to FIG. 2B, each of the plurality of spring seats 192 are substantially cylindrical, and are each defined about a perimeter or circumference of the enclosure cover 184. The plurality of spring seats 192 are spaced apart about the circumference of the enclosure cover 184 at a first end 184' to correspond with a spacing of at least one or a plurality of biasing members or springs 200 of the lock 18. Each of the plurality of spring seats 192 receive a respective one of the plurality of springs 200 to provide a seat for an end of the respective spring 200.

Figure 7:
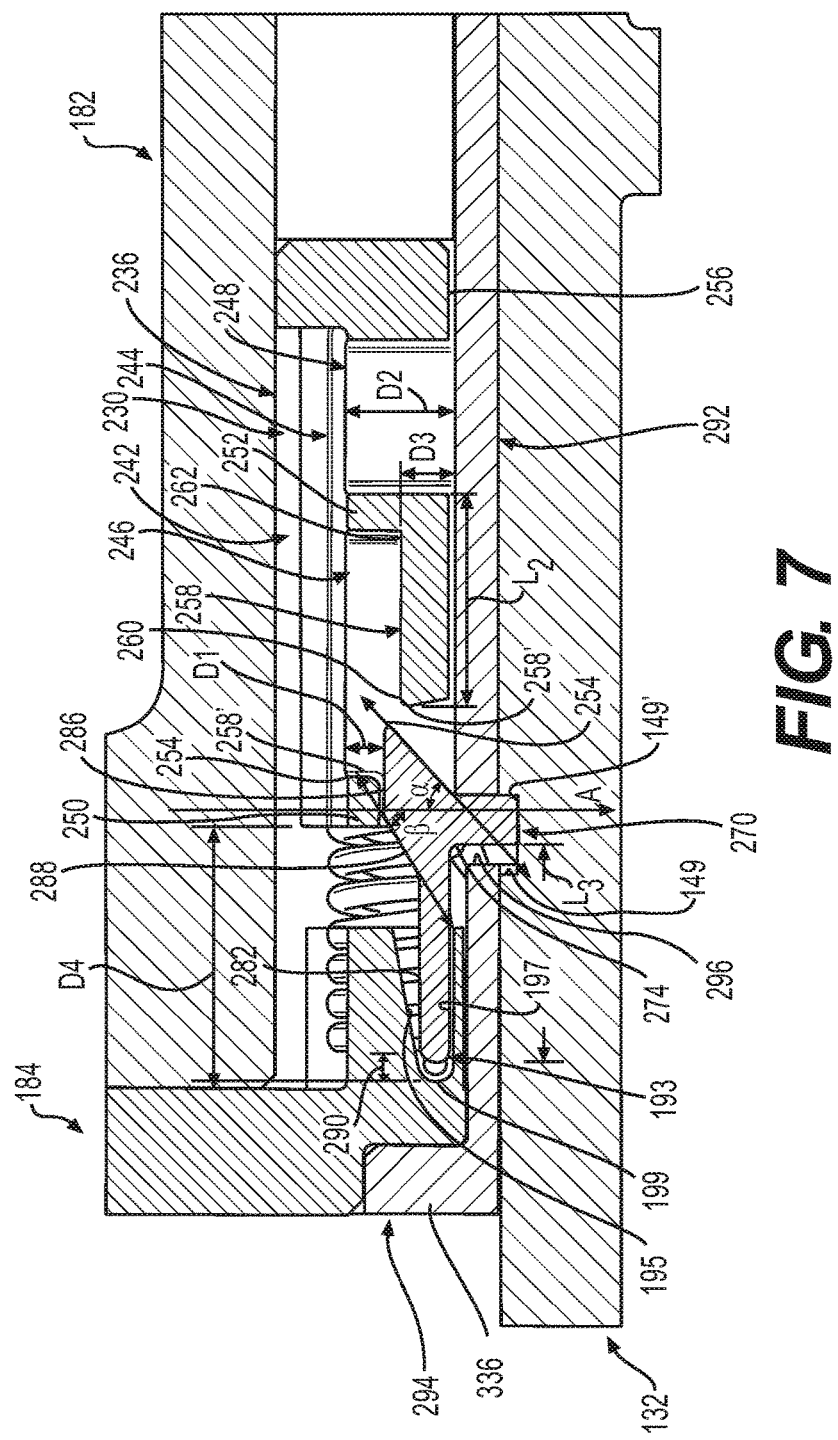
FIG. 7 is a detail partial cross-sectional view of the lock, taken along line 7-7 in FIG. 4, which illustrates the lock in the first, locked position.

With reference to FIGS. 2B and 7, the plurality of pawl recesses 193 are shown in greater detail. Each of the plurality of pawl recesses 193 are substantially V-shaped, and are defined about a perimeter or circumference of the enclosure cover 184. Generally, with reference to FIG. 2B, the pawl recesses 193 alternate with the spring seats 192 about the circumference of the enclosure cover 184 such that pawl recesses 193 are substantially aligned with a portion of the lock 18. With reference to FIG. 7, each of the pawl recesses 193 includes a first, angled surface 195 and a second, planar surface 197, which are joined together by a curved wall 199. Each of the angled surface 195, the planar surface 197 and the curved wall 199 cooperate with the portion of the lock 18 to enable the lock 18 to move between the first, locked position and the second, unlocked position.

With reference back to FIG. 2, the lip recess 194 is defined along a central bore 202 defined by the enclosure cover 184. Generally, the lip recess 194 is an area of the central bore 202 that has a larger diameter than a remainder of the central bore 202 to receive the lip 336 of a second lock housing portion 294 of the lock housing 229. In one example, the lip recess 194 is sized to form an interference fit with a lip 336 of the second lock housing portion 294 to assist in coupling the enclosure cover 184 to the lock housing 229. Generally, the piston shaft 132 is received through the central bore 202.

With continued reference to FIG. 2, the cover mounting flange 196 is defined about a perimeter or circumference of the enclosure cover 184 at a second end 184" of the enclosure cover 184, with the second end 184" substantially opposite the first end 184'. The cover mounting flange 196 defines a plurality of bores, through which a respective plurality of mechanical fasteners may pass to couple the enclosure cover 184 and the end cap 186 to the enclosure housing 182.

Figure 5:
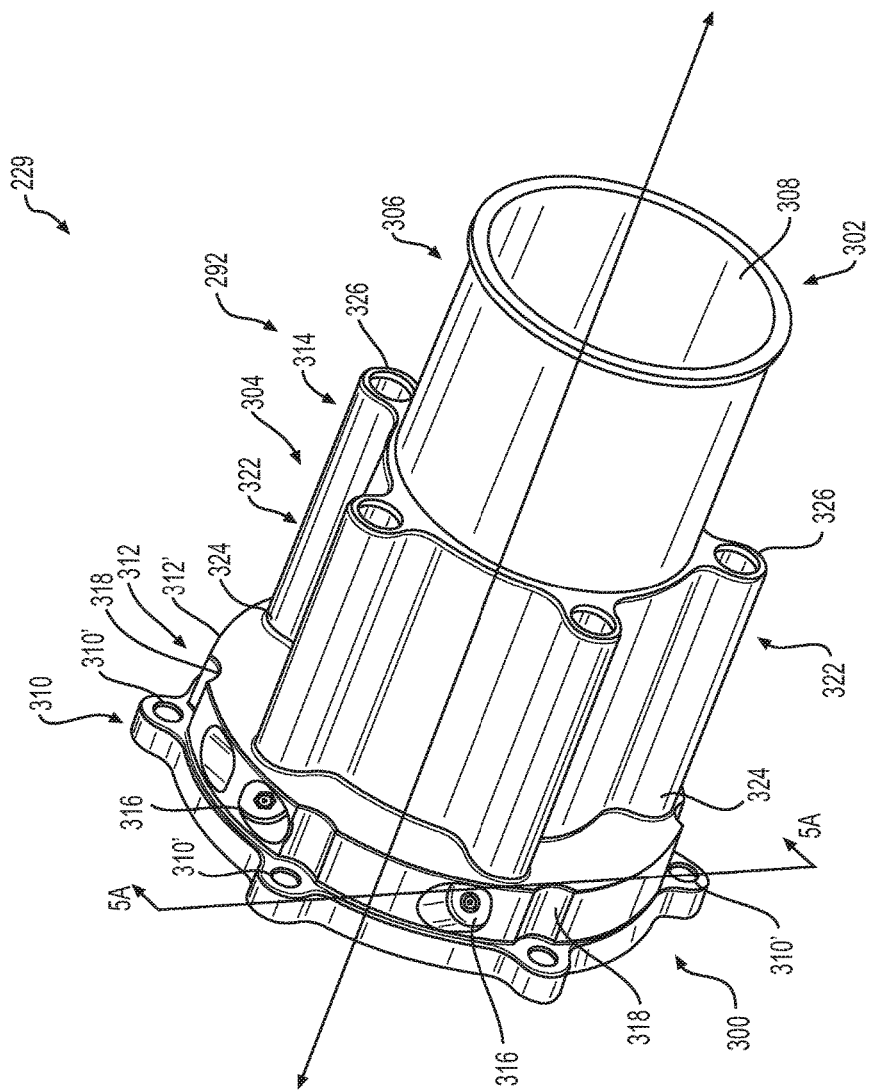
FIG. 5 is a perspective view of a first lock housing portion of a lock housing for the lock of the thrust vector actuator of FIG. 1, in accordance with the various teachings of the present disclosure.

The lock housing 229 is coupled to the first housing portion 30 at the second end 36. The lock housing 229 substantially surrounds a portion of the piston shaft 132. With reference to FIG. 5, the lock housing 229 is shown in greater detail. The lock housing 229 is composed of a metal or metal alloy, and may be forged, cast, machined, selective laser sintered, etc. In one example, the lock housing 229 includes a first lock housing portion 292 and a second lock housing portion 294. Generally, the first lock housing portion 292 is spaced apart from the second lock housing portion 294 about the circumference of the piston shaft 132 to define a channel 296. The channel 296 enables a portion of the lock 18 to engage with the annular groove 149 of the piston shaft 132. The first lock housing portion 292 includes a first lock housing end 300 substantially opposite a second lock housing end 302, a conduit portion 304 and a lock seat 306. A central lock housing bore 308 is defined through the first lock housing portion 292 from the first lock housing end 300 to the second lock housing end 302. The central lock housing bore 308 substantially surrounds the piston shaft 132.

The first lock housing end 300 includes a lock housing flange 310, which includes a plurality of bores 310' spaced apart about a perimeter of the first lock housing end 300. The conduit portion 304 is defined adjacent to the lock housing flange 310 so as to be positioned between the lock housing flange 310 and the lock seat 306. The conduit portion 304 defines a first annular conduit ring 312 and a second annular conduit ring 314. The first annular conduit ring 312 includes a plurality of cross-bores 316, and substantially concave recesses 318. Each of the plurality of cross-bores 316 are defined into an exterior surface 312' of the first annular conduit ring 312 so as to extend along an axis substantially transverse or oblique to the longitudinal axis L of the thrust vector actuator 10.

With reference to FIG. 5A, each of the cross-bores 316 are defined through a portion of the exterior surface 312' to define a respective hydraulic passage 320 into the lock housing 229. The hydraulic passages 320 may be defined by drilling, for example. Once the hydraulic passages 320 are defined, a respective plug is inserted into each of the cross-bores 316 to inhibit or prevent hydraulic fluid from exiting the hydraulic passages 320. Each of the hydraulic passages 320 supply hydraulic fluid to a respective conduit 322 associated with the second annular conduit ring 314. In this example, there are four hydraulic passages 320 supplying hydraulic fluid to five conduits 322, however, any number of hydraulic passages 320 may be employed. The hydraulic passages 320 are in fluid communication about the perimeter of the first annular conduit ring 312 and are in fluid communication with an inlet 320' to receive the hydraulic fluid from the second passage 53" of the lock inlet bore 53.

The concave recesses 318 are defined through the exterior surface 312' along a second axis, which is substantially parallel to the longitudinal axis L. Generally, each of the concave recesses 318 receives a head of a respective mechanical fastener to couple the lock housing 229 to the second end 36 of the housing assembly 12.

The second annular conduit ring 314 includes a plurality of conduits 322 defined about a perimeter or circumference of the second annular conduit ring 314. Generally, the conduits 322 are substantially evenly spaced apart from each other about the circumference of the second annular conduit ring 314. Each of the conduits 322 has a first conduit end 324 and a second, opposite conduit end 326. Each of the first conduit ends 324 of the conduits 322 are in fluid communication with a respective one of the hydraulic passages 320 to enable hydraulic fluid to flow into each of the conduits 322; and the second conduit ends 326 are in communication with a portion of the lock 18 to apply a force F (FIG. 3) from the hydraulic fluid to the lock 18. The force F from the hydraulic fluid acts against the lock 18 to positively unlock the lock 18 as will be discussed in greater detail herein. The conduits 322 are illustrated herein as being substantially cylindrical; however, the conduits 322 may have any desired shape.

With reference to FIG. 3, each of the conduits 322 also includes a respective one of a plurality of lock pistons 328. The lock pistons 328 are received within a portion of the conduits 322 and are movable by the hydraulic fluid relative to the respective conduits 322 of the lock housing 229. In this example, each of the lock pistons 328 is movable relative to the respective one of the conduits 322 to extend a distance beyond the second conduit end 326. The extension of each of the lock pistons 328 beyond the conduits 322 causes the lock pistons 328 to contact a portion of the lock 18 and move the lock 18 to a second, unlocked position, as will be discussed herein. The lock pistons 328 are illustrated herein as being substantially cylindrical; however the lock pistons 328 may have any desired shape. The lock pistons 328 each have a first piston end 330 and a second piston end 332. With reference to FIG. 3, the first piston end 330 is in fluid communication with the respective conduits 322 to receive the hydraulic fluid, and the second piston end 332 contacts the portion of the lock 18 as the lock piston 328 is moved by the hydraulic fluid toward the second conduit end 326. Thus, the hydraulic fluid applies the force F to the first piston end 330, which causes the second piston end 332 to advance beyond the second conduit end 326 and thereby contact the portion of the lock 18 to move the lock 18 to the second, unlocked position.

With reference back to FIG. 5, the second annular conduit ring 314 is defined adjacent to the lock seat 306, and the lock seat 306 extends to the second lock housing end 302. The lock seat 306 has a wall thickness that is less than a wall thickness of the second annular conduit ring 314 to enable a portion of the lock 18 to be positioned about the lock seat 306.

With reference to FIG. 3, the second lock housing portion 294 is spaced apart from the first lock housing portion 292 along the piston shaft 132 to define the channel 296, which enables the lock 18 to engage the groove 149. The second lock housing portion 294 has a first end 294' opposite a second end 294". The first end 294' is substantially cylindrical, and has a wall thickness that enables the enclosure housing 184 to be positioned about the circumference of the first end 294'. The second end 294" has a wall thickness greater than the wall thickness of the first end 294' to define a lip 336. The lip 336 extends about a perimeter or circumference of the second lock housing end 302, and assists in retaining the lock 18 about the perimeter of the piston shaft 132. A central bore 294''' is defined through the second lock housing portion 294 to enable the second lock housing portion 294 to be positioned about the piston shaft 132.

With reference to FIG. 6, the lock cylinder 230 is shown. The lock cylinder 230 is composed of a metal or a metal alloy, and may be stamped, cast, forged, etc. In this example, the lock cylinder 230 is annular, and has a first housing end 234 and a second housing end 236. A central lock housing bore 238 is defined through the lock cylinder 230 from the first housing end 234 to the second housing end 236, and enables the lock cylinder 230 to be positioned about the piston shaft 132 (as shown in FIG. 3). The lock cylinder 230 also includes at least one slot 240 and at least one bore 242. In one example, the at least one slot 240 comprises a plurality of slots 240 and the at least one bore 242 comprises a plurality of bores 242. Generally, the number of slots 240 correspond with the number of pawls 232, and the number of bores 242 correspond with the number of springs 200.

The first housing end 234 is substantially planar or flat, and the second housing end 236 is substantially opposite the first housing end 234. Generally, the first housing end 234 is adjacent to the enclosure housing 182 (FIG. 2). Generally, the slots 240 are each defined in a respective one of a plurality of sidewalls 244 that extend between adjacent ones of the bores 242. Thus, the plurality of slots 240 alternate with the plurality of bores 242 about a perimeter or circumference of the lock cylinder 230.

In this example, each of the slots 240 includes a first slot 246 and a second slot 248, which are defined through the perimeter of the lock cylinder 230 between a rib 250 of the sidewall 244 and a portion 252 of the sidewall 244. Generally, with reference to FIG. 7, each of the sidewalls 244 includes a first surface 254 and a second, opposite surface 256. The first surface 254 is an exterior surface of the lock cylinder 230, and is adjacent to the enclosure housing 182, and the second surface 256 is an interior surface, and is adjacent to the piston shaft 132. The rib 250 cooperates with a portion of the bores 242 to define the second housing end 236. The rib 250 generally extends from the first surface 254 toward the second surface 256 for a first distance D1, which is less than a second distance D2 defined between the first surface 254 and the second surface 256. Stated another way, the rib 250 extends from the first surface 254 the first distance D1 to define a cut-out or opening for receipt of a respective one of the pawls 232. The rib 250 may include a rounded or filleted surface 250' to assist in a movement of the respective one of the pawls 232 from a second, unlocked position to a first, locked position.

The portion 252 extends between the first surface 254 and the second surface 256, and thus, extends for the distance D2. The first slot 246 is spaced apart from the second slot 248 by the portion 252 such that the first slot 246 is separate or discrete from the second slot 248. In this example, the first slot 246 includes a ledge 258, which extends axially from the portion 252 for a length L2. The ledge 258 is coupled to the portion 252 and extends outward from the portion 252 towards the rib 250. Stated another way, the ledge 258 extends from the portion 252 towards the second housing end 236. The ledge 258 extends upward from the second surface 256 a third distance D3, which is greater than the first distance D1 and less than the second distance D2. In other words, the ledge 258 is defined in the first slot 246 below the first surface 254, and extends from the second surface 256 toward the first surface 254. The ledge 258 also includes a rounded or filleted surface 258', which also assists in a movement of the respective one of the pawls 232 from the first, locked position to the second, unlocked position. Generally, the filleted surface 258' is defined at a first ledge end 260, which is opposite a second ledge end 262. The second ledge end 262 is coupled to the portion 252.

The second slot 248 is defined through the sidewall 244 from the first surface 254 to the second surface 256. The second slot 248 may provide mass savings for the lock cylinder 230, and may be optional.

With reference back to FIG. 6, the bores 242 are defined in the lock cylinder 230 at the second housing end 236 to extend towards the first housing end 234. Each of the bores 242 is substantially cylindrical, and may be defined through a respective one of a plurality of substantially cylindrical sleeve portions 264 of the lock cylinder 230. It should be noted that while the bores 242 are illustrated as being defined through a respective substantially cylindrical sleeve portion 264 of the lock cylinder 230, the bores 242 may be defined through any suitably shaped portion, such as cylindrical. The plurality of cylindrical sleeve portions 264 are defined about a perimeter or circumference of the lock cylinder 230 and are each spaced apart by a respective one of the plurality of sidewalls 244. Thus, the perimeter of the lock cylinder 230 is defined by alternating respective ones of the plurality of sidewalls 244 and the plurality of cylindrical sleeve portions 264. With reference to FIG. 3, the bores 242 each receive a respective one of the springs 200, and a respective one of the springs 200 is coupled to a respective one of the bores 242. Each of the bores 242 cooperate with a respective one of the spring seats 192 to retain a respective spring 200.

Each of the springs 200 are positioned between a respective one of the bores 242 and a respective one of the spring seats 192. In this example, the springs 200 are metal or metal alloy compression coil springs, which resist the movement of the lock cylinder 230 toward the end cap 186. Generally, the springs 200 each exert a spring force F2 against an end wall 242' of each of the bores 242, and bias the lock cylinder 230 toward the first housing portion 30 in the first, locked position as shown in FIG. 3. As discussed, there are 8 springs 200 associated with the lock 18; however, it will be understood that the number of springs may vary based on the unlock force requirements associated with the lock 18. In this example, the springs 200 maintain the lock cylinder 230 in the first, locked position until the force F applied by the hydraulic fluid acting on the lock pistons 328 exceeds the predefined threshold for hydraulic pressure, which in this example is about 1000 pounds per square inch (psi).

Figure 8:
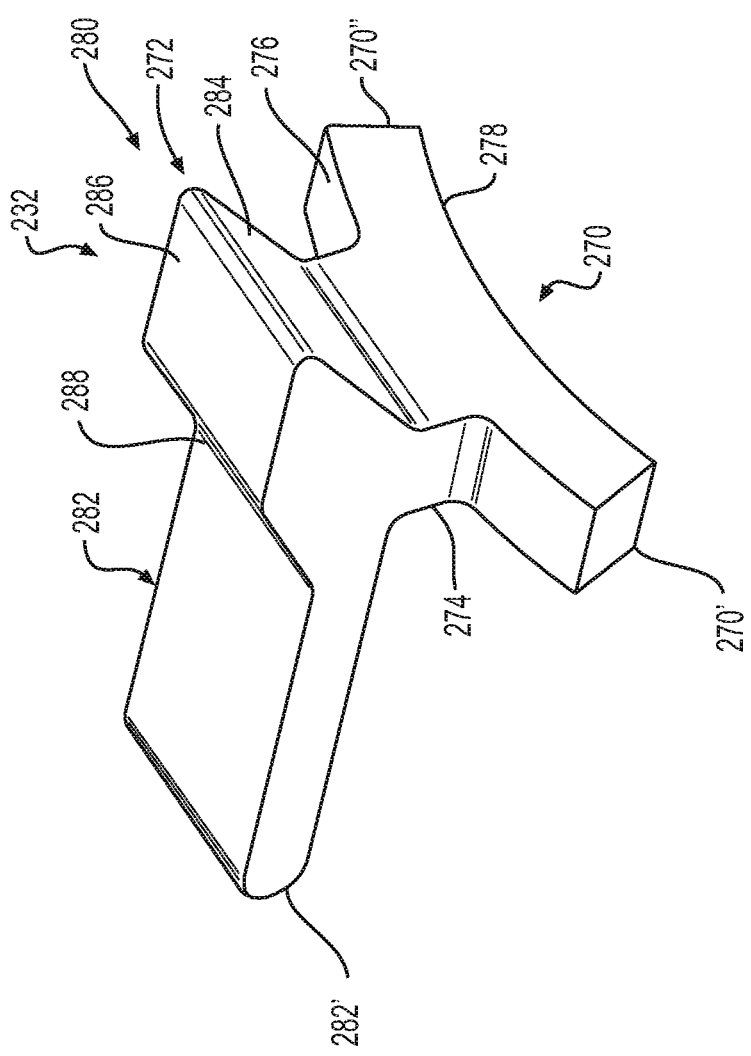
FIG. 8 is a perspective view of a pawl of the lock of FIG. 1.

The pawls 232 are each movable between a first, locked position and a second, unlocked position to enable the lock cylinder 230, and thus, the lock 18, to move from the first, locked position to the second, unlocked position. Each of the pawls 232 may be composed of a metal or metal alloy, which may be cast, stamped, forged, selective metal sintered, etc. With reference to FIG. 8, each of the pawls 232 has a first pawl end 270 and a second pawl end 272. The first pawl end 270 is substantially opposite the second pawl end 272 and is coupled to the second pawl end 272 via a body 274. The first pawl end 270 includes a first pawl surface 276 that is coupled to the body 274 and a second, opposite pawl surface 278. In this example, the second pawl surface 278 is substantially arcuate, and is configured to correspond with a curvature of the piston shaft 132. Generally, the first pawl end 270 has a first arm 270' and a second arm 270" that extend outwardly from the body 274, and thus, the pawl 232. The first arm 270' and the second arm 270" increase a contact surface area of the second pawl surface 278 against the piston shaft 132. In this regard, in the first, locked position, the first pawl end 270 is received within the annular groove 149 (FIG. 3) of the piston shaft 132 such that the second pawl surface 278 contacts a surface 149' of the annular groove 149 to inhibit or prevent the movement of the piston shaft 132. As will be discussed, the first pawl end 270 is releasably coupled to the annular groove 149 (FIG. 3) of the piston shaft 132 of the thrust vector actuator 10.

With reference to FIG. 8, the second pawl end 272 includes a slot engagement feature 280 and a tail 282. The slot engagement feature 280 couples the second pawl end 272 of the pawl 232 to a respective one of the slots 240. Generally, the movement of the second pawl end 272 relative to the respective one of the slots 240 couples and uncouples the first pawl end 270 from the annular groove 149. In this example, the slot engagement feature 280 is a wedge, and includes a first ramp surface 284, a flat or planar surface 286 and a second ramp surface 288. The first ramp surface 284 is substantially opposite the second ramp surface 288. The first ramp surface 284 extends upward from the body 274, and with reference to FIG. 7, is defined at an angle $\alpha$ relative to an axis A defined through the pawl 232. In one example, the angle $\alpha$ is about 40 to about 45 degrees when in the first, locked position. The first ramp surface 284 contacts the filleted surface 258' during a movement of the lock cylinder 230 to guide the pawl 232 between the first, locked position and the second, unlocked position, as will be discussed herein.

The planar surface 286 interconnects the first ramp surface 284 and the second ramp surface 288. The planar surface 286 contacts the rib 250 of the lock cylinder 230, which maintains or holds the pawl 232 in the first, locked position. The second ramp surface 288 extends downward from the planar surface 286 and interconnects the planar surface 286 with the tail 282. The second ramp surface 288 is defined at an angle $\beta$ relative to the axis A defined through the pawl 232. In one example, the angle $\beta$ is about 30 to about 35 degrees when in the first, locked position. The second ramp surface 288 contacts the filleted surface 250' of the rib 250 during a movement of the lock cylinder 230 to guide the pawl 232 between the second, unlocked position and the first, locked position, as will be discussed herein.

The tail 282 of the second pawl end 272 is received within a respective one of the pawl recesses 193 of the enclosure cover 184. The tail 282 generally extends outwardly from the body 274 for a length L3. The length L3 is generally less than a distance D4 defined between the second housing end 236 and the curved wall 199 of the respective pawl recess 193 such that a gap 290 is defined between an end 282' of the tail 282 and the curved wall 199 when the lock cylinder 230 is in the first, locked position. The gap 290 enables the tail 282 to move or translate towards the curved wall 199 during a movement of the lock cylinder 230 toward the enclosure cover 184, which assists in releasing the planar surface 286 from engagement with the rib 250.

The hydraulic source 20 is associated with the launch vehicle 8. Generally, the hydraulic source 20 is a supply of hydraulic fluid, which may be supplied to the manifold 24 via at least one conduit (e.g. flexible hose). In one example, the hydraulic source 20 is a hydraulic pump, which is driven by an engine of the launch vehicle 8. In this example, the hydraulic pump supplies hydraulic fluid under pressure to the manifold 24, via the at least one conduit, and the third inlet conduit of the manifold 24 directs the hydraulic fluid to the lock inlet bore 53 to enable the movement of the lock between the first, locked position and the second, unlocked position.

In order to assemble the thrust vector actuator 10, in one example, with the components of the housing assembly 12, the piston assembly 16 and the lock 18 formed, the first guide ring 134 and the piston seal 136 are coupled to the head 130 of the piston 102. The piston 102 is inserted into the first housing portion 30. The sensor 100 is coupled to the sensor mounting flange 147 and the bore 33' of the third housing portion 33. The second housing portion 32, with the spherical bearing 68 coupled to the mounting extension 64, is coupled to the first housing portion 30 to couple the second housing portion 32 and the third housing portion 33 to the first housing portion 30.

The first lock housing portion 292, with the lock pistons 328 coupled to the conduits 322, is positioned about the piston shaft 132 and coupled to the first housing portion 30. The pawls 232 are coupled to the annular groove 149 of the piston shaft 132, and the lock cylinder 230 is positioned about each of the pawls 232 such that the planar surface 286 of each of the pawls 232 contacts each of the ribs 250. The second lock hosing portion 294 is positioned about the piston shaft 132 so as to be spaced apart from the first lock housing portion 292. The springs 200 are inserted to each of the bores 242 of the lock cylinder 230, and the enclosure housing 182 is positioned about the lock cylinder 230 and coupled to the first housing portion 30. The enclosure cover 184 is coupled to the enclosure housing 182 such that an end of each of the springs 200 is received in a respective one of the spring seats 192 and the tail 282 of each of the pawls 232 is received within a respective one of the pawl recesses 193. The end cap 186 is coupled to the enclosure cover 184 and the enclosure housing 182. The rod end 104 is coupled to the second piston shaft end 146, with the second spherical bearing 218 coupled to the bore 216.

The manifold 24 is coupled to the housing assembly 12, and the hydraulic supply and return device 26 is coupled to the manifold 24. The hydraulic supply and return device 26 is coupled to the hydraulic source 20, so as to be in fluid communication with the hydraulic source 20 to receive the hydraulic fluid.

With the thrust vector actuator 10 assembled, the lock 18 is in the first, locked position (FIG. 3). In the first, locked position, the first pawl end 270 of each of the pawls 232 is received within the annular groove 149 of the piston shaft 132 to inhibit the movement of the piston shaft 132. Upon the receipt of the hydraulic fluid into the third fluid passage 83 of the manifold 24, the hydraulic fluid flows through the lock inlet bore 53 and via the inlet 320' flows into the hydraulic passages 320 of the first lock housing portion 292 (FIG. 5A). From each of the hydraulic passages 320, the hydraulic fluid flows into the conduits 322 and applies pressure to the first piston end 330 of the respective lock pistons 328 (FIG. 3).

Figure 9:
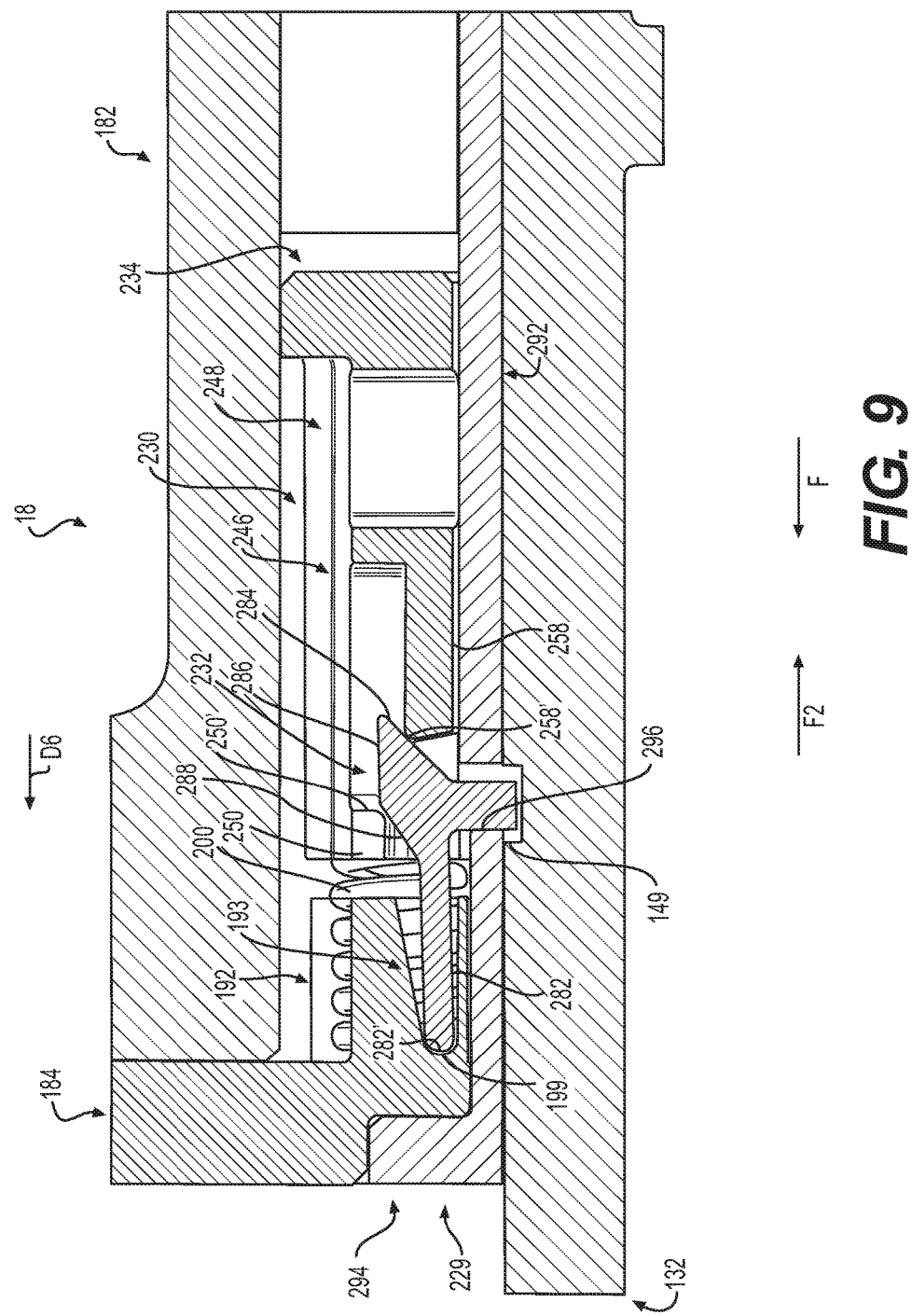
FIG. 9 is a detail partial cross-sectional view of the lock, taken along line 7-7 in FIG. 4, which illustrates the lock in an intermediate position between the first, locked position and a second, unlocked position.

With reference to FIG. 9, as the applied pressure from the hydraulic fluid increases, the lock pistons 328 are moved beyond the second conduit end 326 and apply the force F to the first housing end 234. The application of the force F causes the lock cylinder 230 to move in a direction D6 toward the enclosure cover 184. The movement of the lock cylinder 230 causes each of the pawls 232 to translate within the respective one of the pawl recesses 193 until the end 282' of each of the tails 282 contacts the curved wall 199. The movement of each of the pawls 232 in the direction D6 also causes the first ramp surface 284 to contact the filleted surface 258' of the ledge 258.

Figure 10:
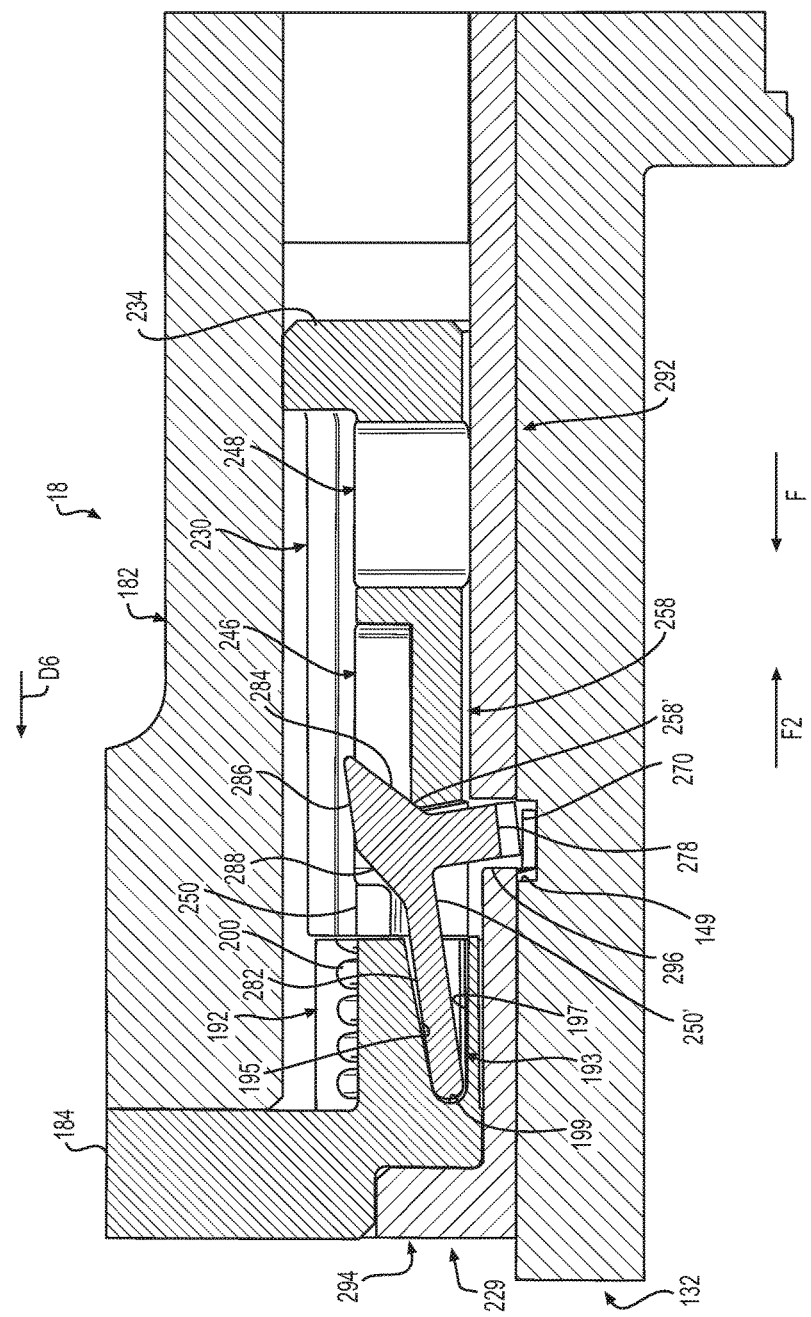
FIG. 10 is a detail partial cross-sectional view of the lock, taken along line 7-7 in FIG. 4, which illustrates the lock in the second, unlocked position.

With reference to FIG. 10, once the hydraulic fluid pressure exceeds the predefined threshold, the force F2 of the springs 200 is overcome, and the lock cylinder 230 moves until the lock cylinder 230 contacts the enclosure cover 184. As the lock cylinder 230 moves or translates in the direction D6 toward the enclosure cover 184, the first ramp surface 284 advances along the filleted surface 258' of the ledge 258 of the first slot 246. This advancement of the second pawl ends 272 into the first slot 246 also causes each of the tails 282 to pivot within the respective pawl recesses 193 such that each of the tails 282 are adjacent to the angled surface 195. The pivoting of each of the tails 282 raises the second pawl surface 278 of the first pawl end 270 out of engagement with the annular groove 149, thereby enabling a movement of the piston shaft 132. Thus, the pressure applied by the hydraulic fluid actively or positively unlocks the lock 18. In this example, the predefined threshold is about 1000 pounds per square inch.

As the hydraulic pressure received from the hydraulic source 20 decreases, the force F2 of the springs 200 begins to overcome the force F of the hydraulic fluid, and the springs 200 move the lock cylinder 230 toward the first housing portion 30 (e.g. in a direction opposite the direction D6). The movement of the lock cylinder 230 toward the first housing portion 30 causes the first ramp surface 284 to slide down the filleted surface 258' of the ledge 258 of the first slot 246. This movement of the second pawl ends 272 from the first slot 246 also causes each of the tails 282 to pivot within the respective pawl recesses 193 such that each of the tails 282 are adjacent to the planar surface 197. The pivoting of each of the tails 282 lowers the second pawl surfaces 278 of the first pawl ends 270 into engagement with the annular groove 149, thereby preventing the movement of the piston shaft 132 (FIG. 4). Thus, the force applied by the springs 200 actively or positively locks the lock 18.

Accordingly, the lock 18 of the thrust vector actuator 10 provides for both positive locking and positive unlocking of the lock 18. This ensures that the piston shaft 132 remains in a fixed positon even while experiencing large loads during transport and installation. For example, the lock 18 maintains the first, locked position while experiencing loads up to 40,000 pounds.

In addition, it should be noted that in various embodiments, the lock 18 may also include a lock sensor. In this embodiment, the lock cylinder 230 includes a permanent magnet target coupled to the lock cylinder 230. In one example, the permanent magnet target is coupled at or near the second slot 248. In this embodiment, the enclosure housing 182 also includes a magnet sensor, such as a Hall effect or proximity sensor. The sensor coupled to the enclosure housing 182 observes the permanent magnet target coupled to the lock cylinder 230 and generates sensor signals based on this observation, which are processed by a processor to determine a position of the lock 18.

In another embodiment, the lock sensor may comprise a sensor that observes a color band defined on the lock cylinder 230. In this embodiment, the enclosure housing 182 may define a window or aperture, through which the sensor observes the color band coupled to the lock cylinder 230, and generates sensor signals based on this observation, which are processed by a processor to determine a position of the lock 18.

Moreover, it will be understood that the movement of the lock from the first, locked position to the second, locked position may be reversed, such that the lock 18 may be in the second, unlocked position when the hydraulic pressure is less than the predefined threshold. Furthermore, while a single annular groove 149 is described and illustrated herein, the piston shaft 132 may include a number of annular grooves 149, which enable the piston shaft 132 to be locked into various detents upon the application of a predefined hydraulic force.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hydraulic lock for a thrust vector actuator having a movable shaft, comprising:

a lock cylinder having a first end and a second end, the lock cylinder including at least one slot and at least one bore, the at least one slot defined through a perimeter of the lock cylinder adjacent to the second end, the at least one bore defined through a portion of the lock cylinder at the second end to extend towards the first end;

at least one biasing member coupled to the at least one bore;

at least one pawl having a first pawl end and a second pawl end, the first pawl end releasably coupled to a groove defined in the shaft of the thrust vector actuator, the second pawl end coupled to the at least one slot, the at least one pawl movable relative to the at least one slot between a first, locked position in which the first pawl end is coupled to the groove to inhibit movement of the shaft, and a second, unlocked position in which the first pawl end is released from the groove; and a cover coupled to the at least one biasing member, wherein a movement of the lock cylinder towards the cover moves the at least one pawl from the first, locked position to the second, unlocked position.

2. The hydraulic lock of claim 1, wherein the first pawl end is interconnected to the second pawl end by a body, and the first pawl end defines an arcuate surface that contacts the groove when the at least one pawl is in the first, locked position.

3. The hydraulic lock of claim 2, wherein the second pawl end includes a tail that extends outwardly from the body and engages a recess defined in the cover in the second, unlocked position.

4. The hydraulic lock of claim 1, wherein the second pawl end includes a first ramp surface substantially opposite a second ramp surface, and the first ramp surface and the second ramp surface each contact the at least one slot in the second, unlocked position.

5. The hydraulic lock of claim 4, wherein the second pawl end includes a planar surface that interconnects the first ramp surface and the second ramp surface, and the planar surface contacts the at least one slot in the first, locked position.

6. The hydraulic lock of claim 5, wherein the at least one slot is defined in a sidewall of the lock cylinder that has a first surface opposite a second surface, the second surface is adjacent to the shaft of the thrust vector actuator, the at least one slot includes a rib that extends from the first surface toward the second surface and contacts the planar surface in the first, locked position.

7. The hydraulic lock of claim 6, wherein the rib has a surface that engages the second ramp surface as the at least one pawl moves from the first, locked position to the second, unlocked position.

8. The hydraulic lock of claim 4, wherein the at least one slot is defined in a sidewall of the lock cylinder that has a first surface opposite a second surface, the second surface is adjacent to the shaft of the thrust vector actuator, the at least one slot includes a ledge that projects upward from the second surface toward the first surface and engages the first ramp surface as the at least one pawl moves from the first, locked position to the second, unlocked position.

9. The hydraulic lock of claim 1, further comprising a lock housing that surrounds the shaft, the lock housing including at least one lock piston in fluid communication with a hydraulic source to receive a hydraulic fluid, and the at least one lock piston is movable relative to a portion of the lock housing to move the lock cylinder towards the cover.

10. The hydraulic lock of claim 9, wherein the at least one lock piston is received within at least one conduit defined by the lock housing, and the at least one conduit is adjacent to the first end of the lock cylinder such that the at least one lock piston contacts the first end of the lock cylinder upon receipt of the hydraulic fluid.

11. The hydraulic lock of claim 9, wherein the lock housing defines at least one slot that aligns with the groove and the first pawl end is received through the at least one slot.

12. A hydraulic lock for a thrust vector actuator having a movable shaft, comprising:

a lock cylinder having a first end and a second end, the lock cylinder including at least one slot and at least one bore, the at least one slot defined through a sidewall of the lock cylinder adjacent to the second end, the at least one bore defined through a portion of the lock cylinder at the second end to extend towards the first end, the sidewall having a first surface opposite a second surface, and a ledge that extends from the second surface towards the first surface;

at least one biasing member coupled to the at least one bore;

at least one pawl having a first pawl end and a second pawl end, the first pawl end releasably coupled to a groove defined in the shaft of the thrust vector actuator, the second pawl end coupled to the at least one slot, the at least one pawl movable relative to the at least one slot between a first, locked position in which the first pawl end is coupled to the groove to inhibit movement of the shaft, and a second, unlocked position in which the first pawl end is released from the groove, the second pawl end having a first ramp surface that engages with the ledge as the at least one pawl moves from the first, locked position to the second, unlocked position; and a cover coupled to the at least one biasing member and the at least one pawl, wherein a movement of the lock cylinder towards the cover moves the at least one pawl from the first, locked position to the second, unlocked position.

13. The hydraulic lock of claim 12, wherein the first pawl end is interconnected to the second pawl end by a body, and the first pawl end defines an arcuate surface that contacts the groove when the at least one pawl is in the first, locked position.

14. The hydraulic lock of claim 13, wherein the second pawl end includes a tail that extends outwardly from the body and engages a recess defined in the cover in the second, unlocked position.

15. The hydraulic lock of claim 12, wherein the second pawl end includes a second ramp surface substantially opposite the first ramp surface, and the second ramp surface contacts the at least one slot in the second, unlocked position.

16. The hydraulic lock of claim 12, wherein the second pawl end includes a planar surface that interconnects the first ramp surface and the second ramp surface, and the planar surface contacts the at least one slot in the first, locked position.

17. The hydraulic lock of claim 16, wherein the second surface is adjacent to the shaft of the thrust vector actuator, the at least one slot includes a rib that extends from the first surface toward the second surface and contacts the planar surface in the first, locked position, and the rib has a surface that engages the second ramp surface as the at least one pawl moves from the first, locked position to the second, unlocked position.

18. The hydraulic lock of claim 12, further comprising a lock housing that surrounds the shaft, the lock housing defining at least one conduit and including at least one lock piston received within the at least one conduit, the at least one conduit in fluid communication with a hydraulic source to receive a hydraulic fluid, and the at least one conduit is adjacent to the first end of the lock cylinder such that the at least one lock piston contacts the first end of the lock cylinder upon receipt of the hydraulic fluid to move the lock cylinder towards the cover.

19. A thrust vector actuator having a movable shaft, comprising:
    a lock housing that surrounds the shaft and defines at least one conduit in fluid communication with a hydraulic source to receive a hydraulic fluid, the lock housing including at least one lock piston received within the at least one conduit;
    a lock including:
        a lock cylinder having a first end and a second end, the lock cylinder including at least one slot and at least one bore, the at least one slot defined through a sidewall of the lock cylinder adjacent to the second end, the at least one bore defined through a portion of the lock cylinder at the second end to extend towards the first end, the sidewall having a first surface opposite a second surface, and a ledge that extends from the second surface towards the first surface;
        at least one biasing member coupled to the at least one bore;
        at least one pawl having a first pawl end and a second pawl end, the first pawl end releasably coupled to a groove defined in the shaft of the thrust vector actuator, the second pawl end coupled to the at least one slot, the at least one pawl movable relative to the at least one slot between a first, locked position in which the first pawl end is coupled to the groove to inhibit movement of the shaft, and a second, unlocked position in which the first pawl end is released from the groove, the second pawl end having a first ramp surface that engages with the ledge as the at least one pawl moves from the first, locked position to the second, unlocked position; and
        a cover coupled to the at least one biasing member,
    wherein upon receipt of the hydraulic fluid, the at least one lock piston contacts the first end of the lock cylinder to move the lock cylinder towards the cover, and the movement of the lock cylinder towards the cover moves the at least one pawl from the first, locked position to the second, unlocked position.

20. The thrust vector actuator of claim 19, wherein the first pawl end is interconnected to the second pawl end by a body, the second pawl end includes a tail that extends outwardly from the body and the tail engages a recess defined in the cover in the second, unlocked position.

* * * * *